United States Patent Office 3,583,975
Patented June 8, 1971

3,583,975
SUBSTITUTED OCTAMETHYLENEIMINES
William J. Houlihan, 15 Raynold Road, Mountain Lakes, N.J. 07046, and Robert E. Manning, 350 Baldwin Road, Parsippany, N.J. 07054
No Drawing. Filed Dec. 6, 1965, Ser. No. 511,984
Int. Cl. C07d 35/36, 41/00
U.S. Cl. 260—239                    6 Claims

ABSTRACT OF THE DISCLOSURE

This disclosure pertains to hexahydro-3-benzazonines, e.g., 9,10 - dimethoxy - 3 - methyl-7-phenyl-1H-2,3,4,5,6,7-hexahydro-3-benzazonine. These compounds are useful as central nervous system stimulants, hypotensives and anti-inflammatories.

---

The present invention is directed to pharmaceutically acceptable benzazonines, particularly therapeutically active 1H - 2,3,4,5,6,7 - hexahydro - 3 - benzazonines of the formula

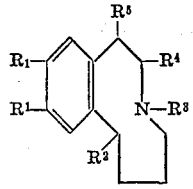

I wherein:

R is either a hydrogen atom (—H); methyl; ethyl; lower straight chain alkoxy (preferably having from 1 to 4 carbon atoms), e.g. methoxy, ethoxy, propoxy and butoxy; or, together with $R^1$, methylenedioxy (—O—$CH_2$—O—); $R^1$ is either a hydrogen atom (—H); methyl; ethyl; lower straight chain alkoxy (preferably having from 1 to 4 carbon atoms), e.g. methoxy, ethoxy, propoxy and butoxy; or, together with R, methylenedioxy (—O—$CH_2$—O—);
$R^2$ is either a hydrogen atom (—H); lower straight chain alkyl (preferably having from 1 to 4 carbon atoms), e.g. methyl, ethyl, propyl and butyl; —Y or —$(CH_2)_n$—Y;
$R^3$ is lower straight chain alkyl (preferably having from 1 to 4 carbon atoms), e.g. methyl, ethyl, propyl and butyl;
each of $R^4$ and $R^5$ is independently, either a hydrogen atom (—H), methyl or ethyl;
Y is phenyl of the formula

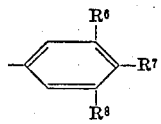

each of $R^6$, $R^7$ and $R^8$ is either a hydrogen atom (—H); methyl; ethyl; lower straight chain alkoxy (preferably having from 1 to 4 carbon atoms), e.g. methoxy, ethoxy, propoxy and butoxy; or, together with its adjacent counterpart, methylenedioxy (—O—$CH_2$—O—); and n is either 1, 2 or 3;

and acid additions salts thereof.

It is an object of this invention to provide new pharmaceutically acceptable and therapeutically active compounds. It is a further object to provide such compounds both as free bases and as pharmaceutically acceptable acid addition salts thereof. Additional objects will be apparent from the description which follows.

In the preparation of compounds I, of the formula

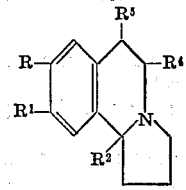

II wherein each of R, $R^1$, $R^2$, $R^4$ and $R^5$ has its above-ascribed meaning, as it does throughout the specification, are key intermediates. These key intermediates are prepared according to the following reaction scheme:

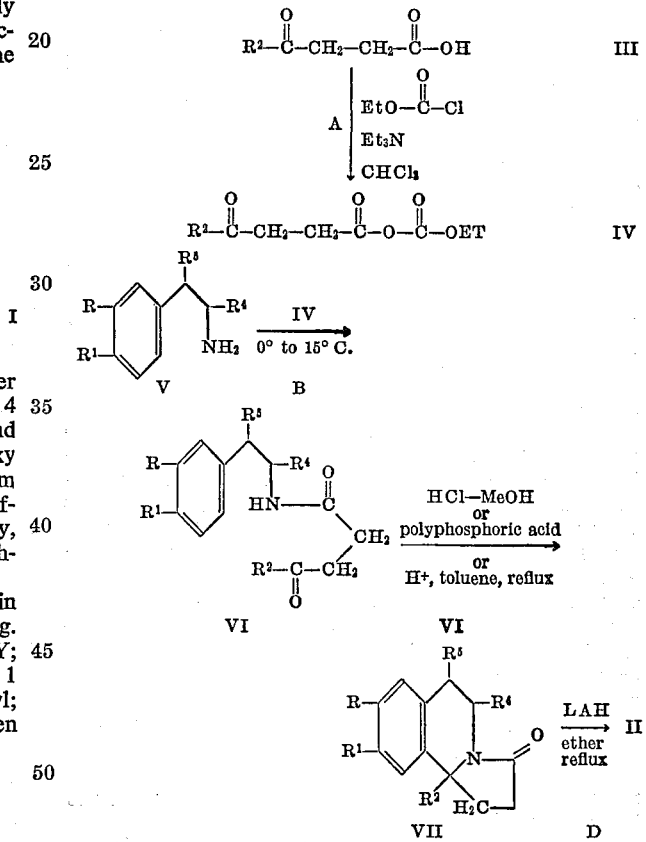

Steps A and B are effected sequentially (without separation) to form a mixed anhydride IV by admixing ethyl chloroformate (ethyl chlorocarbonate) with a keto acid III and triethylamine in chloroform at a temperature from 0° to 15° C., followed by admixture of a β-phenethylamine V with the resultant (maintained in the same temperature range).

Step C is a cyclization. It is effected with polyphosphoric acid (PPA) at a temperature from 60° to 120° C. Alternatively, it may be effected either with from a 0.5 to a 5.0 percent methanolic solution of hydrogen chloride at a temperature from room temperature (20° C.) to reflux or with an acid, such as para-toluenesulfonic acid, in toluene under reflux.

Step D is effected by refluxing (with stirring) with lithium aluminum hydride (LAH) in an ether, such as diethylether, dibutylether, tetrahydrofuran and dioxane.

The IX salts IX of compounds II are prepared according to known, well-established procedures from compounds II:

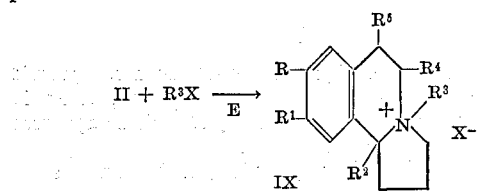

wherein:

$R^3$ has its above-ascribed meaning, as it does throughout the specification; and X is a halogen atom, e.g. iodine (—I) and chlorine (—Cl).

Compounds IX are prepared at room temperature in a solvent, e.g. an ether (diethylether or dioxane), either alone or in combination with another solvent, e.g. methylene chloride.

Compounds I are prepared from IX

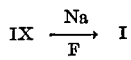

in a solvent system at a temperature from −70° to 0° C. The metal sodium can be replaced by other alkali metals, e.g. lithium and potassium. As a solvent sysetm for reaction F there may be used lower monoalkylamines ($R°—NH_2$), e.g. methylamine, ethylamine and propylamine; lower dialkylamines ($R°—NH—R'$) wherein each of R° and R' is, independently, either methyl, ethyl or n-propyl, e.g. dimethylamine; or lower alkylene diamines [$R''—NH—(CH_2)_m—NH—R^*$] wherein each of R'' and R* is, independently, either a hydrogen atom, methyl, ethyl or n-propyl, and m is either 2 or 3, e.g. N,N'-dimethylethylenediamine.

The acid addition salts of compounds I are prepared according to known, well-established procedures. (See, for example, step E.) Among the pharmaceutically acceptable acid addition salts of compounds I are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C—SO_3H$); dibasic acids, e.g., succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salt is pharmaceutically acceptable; the acid does not nullify the therapeutic properties of compounds I.

When $R^5$, $R^4$ and/or $R^2$ is other than a hydrogen atom, $C_1$, $C_2$ and/or $C_7$, respectively, is an asymmetric carbon atom. Compounds I can have as many as three asymmetric carbon atoms; either $C_1$, $C_2$ or $C_7$ can be asymmetric irrespective of the symmetry of the others.

Compounds I thus include optical and geometric isomers, racemates, racemic mixtures and mixtures of optically active isomers. Resolution of racemates of compounds I into their optical antipodes (enantiomers) is effected according to procedures well-known to the art-skilled.

The preparation of particular acid addition salts and the isolation of chemical individuals, i.e. enantiomers, of compounds I and corresponding acid addition salts do not constitute essential parts of this invention, but the respective products are within the scope of this invention. The methods employed are known methods. When an optically active compound I is employed to prepare an acid addition salt, the resulting salt has the same stereochemistry as its precursor. Likewise, optically active compounds I are prepared from corresponding optically active compounds II and/or IX. A compound II or a compound IX having an asymmetric carbon atom is resolved, e.g., by preparing the tartrate from an enantiomer of tartaric acid.

Compounds I and their pharmaceutically acceptable acid addition salts are CNS-active compounds and are useful as central nervous system (CNS) stimulants, antidepressants, appetite suppressants, antihypertensive-hypotensives and anti-inflammatories. They are administered either orally or parenterally in standard dosage forms, e.g. tablets and capsules, in daily does of from 20 to 150 milligrams.

Each of the pharmaceutically active compounds of this invention, may be, e.g. incorporated, for oral administration, in a tablet as the sole active ingredient. A typical tablet is constituted by from 1 to 3 percent binder, e.g. tragacanth; from 3 to 10 percent disnitegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulaion for the instant active compounds is:

| | Parts |
|---|---|
| Title compound of Example 11 | 70 |
| Tragacanth | 2 |
| Lactose | 19.5 |
| Corn starch | 5 |
| Talcum | 3 |
| Magnesium stearate | 0.5 |
| Alcohol SD-30, purified water: q.s. | |

In the following examples all temperatures are in degrees centigrade. Parts and percentages are by weight unless otherwise specified. The relationship between parts by weight and parts by volume is the same as that between the kilogram and the liter.

EXAMPLE 1

N-[2-(p-methoxyphenyl)ethyl]-3-benzoylpropionamide

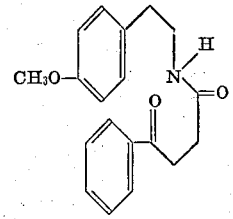

Add dropwise (over a period of one hour) to a stirred solution of 17.8 parts (0.10 mole) of 3-benzoylpropionic acid and 10.1 parts (0.10 mole) of triethylamine in 175 parts by volume of chloroform, within the temperature range of 0° to 5°, a solution of 10.8 parts (0.10 mole) of ethylchloroformate in 25 parts by volume of chloroform. Stir the resultant for an additional three hours. To the thus-stirred solution, add dropwise (over a period of fifteen minutes) a chloroform solution of 15.1 parts (0.10 mole) of β-(4-methoxyphenyl)-ethylamine. Stir the thus-obtained reaction mixture over night (17 hours); extract same with dilute hydrochloric acid; wash with dilute sodium carbonate solution; dry over sodium sulfate and evaporate in vacuo. Crystallize the residue from benzene-pentane to obtain 14 parts of title compound, melting point (M.P.) 96° to 97°.

Replacing the 3-benzoylpropionic acid with an equivalent of either 3-(p-chlorobenzoyl)propionic acid or 3-(3, 5-dimethylbenzoyl)-propionic acid results in the preparation, in similar manner, of the corresponding compound VI.

EXAMPLE 2

N-[2-(3,4-dimethoxyphenyl)ethyl]-4-oxo-valeramide

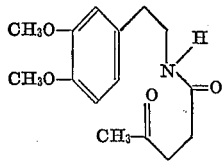

Add dropwise (over a period of one hour) to a stirred solution of 34.8 parts (0.30 mole) of levulinic acid and 30.6 parts (0.30 mole) of triethylamine in 175 parts by volume of chloroform, within the temperature range of 0° to 5°, a solution of 32.4 parts (0.30 mole) of ethylchloroformate in 25 parts by volume of chloroform. Stir the resultant solution for an additional three hours. To the thus-stirred solution, add dropwise (over a period of fifteen minutes) a chloroform solution of 54.3 parts (0.30 mole) of β-(3,4-dimethoxyphenyl)-ethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane to obtain 17 parts of title compound, M.P. 88° to 90°.

Replacing the levulinic acid with an equivalent of either 4-oxohexanoic acid or 4-oxoheptanoic acid results in the preparation, in similar manner, of the corresponding compound VI.

EXAMPLE 3

N-(2-phenylethyl)-3-benzoylpropionamide

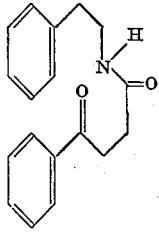

Add dropwise (over a period of one hour) to a stirred solution of 44.5 parts (0.25 mole) of 3-benzoylpropionic acid and 25.2 parts (0.25 mole) of triethylamine in 350 parts by volume of chloroform, within the temperature range of 0° to 5°, a solution of 28 parts (0.25 mole) of ethylchloroformate in 50 parts by volume of chloroform. Stir the resultant for an additional three hours. To the thus-stirred solution, add dropwise (over a period of fifteen minutes) a chloroform solution of 30.2 parts (0.25 mole) of 2-phenethylamine. Stir the thus-obtained reaction mixture overnight; extract same with dilute hydrochloric acid; wash the dilute sodium carbonate solution; dry over sodium sulfate and evaporate in vacuo. Crystallize the residue from benzene-pentane to obtain 25 parts of title compound, M.P. 98°.

Replacing the 3-benzoylpropionic acid with an equivalent of either 3-(3,5-dichlorobenzoyl)propionic acid or 3-(4-ethylbenzoyl)-propionic acid results in the preparation, in similar manner, of the corresponding compound VI.

EXAMPLE 4

10b-phenyl-1,5,6,10b-tetrahydropyrrolo[2,1-a]isoquinolin-3(2H)-one

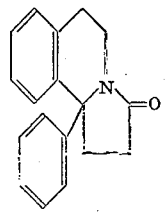

Heat a solution of 60 parts of N-(2-phenylethyl)3-benzoylpropionamide in 600 parts of polyphosphoric acid at 100° for 16 hours. Admix the thus-obtained dark brown reaction mixture with water and chloroform; wash the organic phase with sodium carbonate solution; dry same over sodium sulfate and evaporate under reduced pressure. Filter a solution of the thus-obtained residue in a benzene-chloroform mixture through a bed of alumina and evaporate the eluant in vacuo. Crystallize the resultant oil from benzene-pentane to obtain 21 parts of pure title compound, M.P. 88°.

Replacing the N-(2-phenethyl)-3-benzoylpropionamide with an equivalent of either N-[2-(p-methoxyphenyl)ethyl] - 3-benzoylpropionamide or N-[2-(3,4-dimethoxyphenyl)ethyl]-3-benzoylpropionamide results in the preparation, in similar manner, of the corresponding compound VII.

EXAMPLE 5

N-[2-(3,4-dimethoxyphenyl)ethyl]-3-benzoylpropionamide

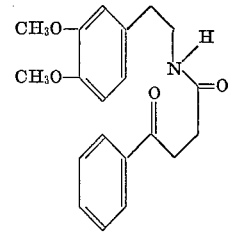

Add dropwise (over a period of one hour) to a stirred solution of 17.8 parts (0.10 mole) of 3-benzoylpropionic acid and 10.1 parts (0.10 mole) of triethylamine in 175 parts by volume of chloroform, within the temperature range of 0° to 5°, a solution of 10.8 parts (0.10 mole) of ethylchloroformate in 25 parts by volume of chloroform. Stir the resultant for an additional three hours. To the thus-stirred solution, add dropwise (over a period of fifteen minutes) a chloroform solution of 18.1 parts (0.10 mole) of β-(3,4-dimethoxyphenyl)ethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane to obtain 12 parts of title compound, M.P. 94° to 95°.

Replacing the 3-benzoylpropionic acid with an equivalent of 3-(3-propylbenzoyl)propionic acid results in the preparation, in similar manner, of the corresponding compound VI.

EXAMPLE 6

8,9-dimethoxy-10b-phenyl-1,5,6,10b-tetrahydropyrrolo[2,1-a]isoquinolin-3(2H)-one

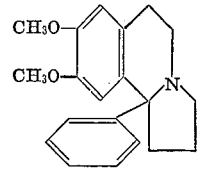

Heat under reflux for 12 hours a solution of 28 parts of N-[2-(3,4-dimethoxyphenyl)ethyl] - 3 - benzoylpropionamide in 600 parts by volume of methanol containing 15 parts by volume of concentrated hydrochloric acid. Make the reaction mixture basic with the addition thereto of sodium bicarbonate solution and extract with ether. Dry the ether phase over sodium sulfate and evaporate in vacuo. Recrystallization the crystalline residue from methanol to obtain 20 parts of title compound, M.P. 146° to 147°.

The process illustrated by this example appears to be specific to the preparation of 8,9-dimethoxy-10b-aryl-1,5,6-10b-tetrahydropyrrolo[2,1-a]isoquinolin-3(2H)-ones.

EXAMPLE 7

8,9-dimethoxy-10b-phenyl-1,2,3,5,6,10b-hexahydro-
pyrrolo[2,1-a]isoquinoline

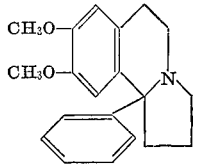

Add dropwise to a solution of 4.5 parts of lithium aluminum hydride (LAH) in diethylether heated under reflux a solution of 12 parts of 8,9-dimethoxy-10b-phenyl-1,5,6,10b-tetrahydropyrrolo[2,1-a]isoquinolin - 3(2H) - one in tetrahydrofuran (THF). After heating the resultant for several hours, add (successively) ethylacetate and water; filter the reaction mixture. Evaporate the filtrate in vacuo and crystallize the residue from benzene-pentane to obtain 7 parts of pure title compound, M.P. 95° to 96°.

Replacing the 8,9 - dimethoxy-10b-phenyl-1,5,6,10b-tetrahydropyrrolo[2,1-a]isoquinolin-3(2H)-one with an equivalent of 10b-phenyl-1,5,6,10b-tetrahydropyrrolo[2,1-a]isoquinolin-3(2H)-one results in the preparation, in similar manner, of the corresponding compound II.

EXAMPLE 8

8,9-dimethoxy-10b-phenyl-1,2,3,5,6,10b-hexahydro-
pyrrolo[2,1-a]isoquinoline methiodide

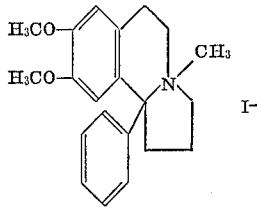

Dissolve 10 parts of 8,9-dimethoxy-10b-phenyl-1,2,3,5,6,10b-hexahydropyrrolo[2,1-a]isoquinoline in an admixture of 13 parts by volume of methanol, 90 parts by volume of diethylether and 20 parts by volume of methyl iodide. Maintain the resulting solution at 8° for 17 hours. Thereafter filter the precipitated crystals and recrystallize same from methanol to obtain 10 parts of title compound, M.P. 260° to 262°.

Replacing the 8,9-dimethoxy-10b-phenyl-1,2,3,5,6,10b-hexahydropyrrolo[2,1-a]isoquinoline with an equivalent of either 8,9-dimethoxy-1-ethyl-2-methyl-10b-phenyl-1,2,3,5,6,10b-hexahydropyrrolo[2,1-a]isoquinoline or 2 - ethyl-8-methoxy - 1 - methyl - 10b-phenyl-1,2,3,5,6,10b-hexahydropyrrolo[2,1-a]isoquinoline results in the preparation, in similar manner, of the corresponding compound IX.

EXAMPLE 9

8,9-dimethoxy-1,2,3,5,6,10b-hexahydropyrrolo
[2,1-a]isoquinoline methiodide

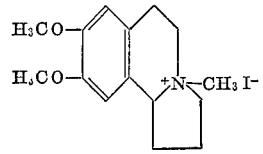

Dissolve 18 parts of 8,9-dimethoxy-1,2,3,5,6,10b-hexahydropyrrolo[2,1-a]isoquinoline [prepared according to the method of Child, R., and Pyman, F. L., "Journal of the Chemical Society, London," 36 (1931)] in an admixture of 20 parts by volume of methanol, 80 parts by volume of diethylether and 40 parts by volume of methyl iodide. Maintain the resulting solution at 8° for 17 hours. Thereafter filter the precipitated crystals and recrystallize same from methanol to obtain 19 parts of title compound, M.P. 215° to 218°.

Replacing the 8,9-dimethoxy-1,2,3,5,6,10b-hexahydropyrrolo[2,1-a]isoquinoline with an equivalent of either 1-ethyl-9-methoxy - 2 - methyl - 1,2,3,5,6,10b-hexahydropyrrolo[2,1-a]isoquinoline or 8,9-dimethoxy-2-methyl-1,2,3,5,6,10b-hexahydropyrrolo[2,1-a]isoquinoline results in the preparation, in similar manner, of the corresponding compound IX.

EXAMPLE 10

10b-benzyl-8,9-dimethoxy-1,2,3,5,6,10b-hexahydro-
pyrrolo[2,1-a]isoquinoline methiodide

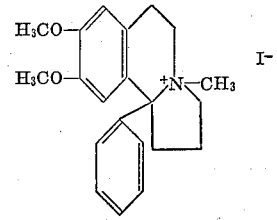

Dissolve 8 parts of 10b-benzyl - 8,9 - dimethoxy-1,2,3,5,6,10b-hexahydropyrrolo[2,1-a]isoquinoline in an admixture of 60 parts by volume of diethylether and 20 parts by volume of methyl iodide. Maintain the resulting solution at 8° for 17 hours. Thereafter filter the precipitated crystals and recrystallize same from methanol to obtain 9 parts of title compound, M.P. 205° to 208°.

Replacing the 10b-benzyl-8,9-dimethoxy - 1,2,3,5,6,10b-hexahydropyrrolo[2,1-a]isoquinoline with an equivalent of either 10b-(3,5 - dimethylbenzyl) - 8,9 - methylenedioxy - 1,2,3,5,6,10b - hexahydropyrrolo[2,1-a]isoquinoline or 10b-p-methoxybenzyl - 1,2,3,5,6,10b - hexahydropyrrolo[2,1-a]isoquinoline results in the preparation, in similar manner, of the corresponding compound IX.

EXAMPLE 11

9,10-dimethoxy-3-methyl-7-phenyl-1H-2,3,4,5,6,7-
hexahydro-3-benzazonine hydrochloride

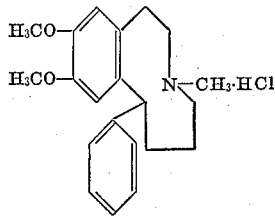

Suspend 8 parts of the title compound of Example 8 in 400 parts by volume of liquid ammonia (in a flask immersed in a Dry Ice/acetone bath). Add (with stirring) 2.4 parts of sodium to the resulting suspension. After continuing the stirring for an hour following the sodium addition, permit the obtained reaction mixture to evaporate for 17 hours.

Admix the resulting residue successively with methanol, with water and with diethylether. Wash the ether phase with water; dry same over sodium sulfate; and evaporate. The free base of the title compound is thus obtained as an oil.

To convert said oil to the hydrochloride salt, pass excess hydrogen chloride gas through a diethylether solution of the oil.

Crystallize the thus-obtained hydrochloride from methanolacetone to obtain 5.5 parts of title compound, M.P. 235° to 238°.

Replacing the title compound of Example 8 with an equivalent of either 9-methoxy - 1 - methyl - 10b - p-tolyl-1,2,3,5,6,10b - hexahydropyrrolo[2,1 - a]isoquinoline methiodide or 1-ethyl-10b-(3,4 - methylenedioxyphenyl-1,2,3,5,6,10b - hexahydropyrrolo[2,1-a]isoquinoline methiodide results in the preparation, in similar manner, of the corresponding acid addition salt of compound I. Other pharmaceutically acceptable acid addition salts are pre-

EXAMPLE 12

9,10-dimethoxy-3-methyl-1H-2,3,4,5,6,7-hexahydro-3-benzazonine

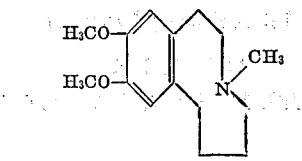

Suspend 15 parts of the title compound of Example 9 in 600 parts by volume of liquid ammonia (in a flask immersed in a Dry Ice/acetone bath). Add (with stirring) 4.5 parts of sodium to the resulting suspension. After continuing the stirring for an hour following the sodium addition, permit the obtained reaction mixture to evaporate for 17 hours.

Admix the resulting residue successively with methanol, with water and with diethylether. Wash the ether phase with water; dry same over sodium sulfate; and evaporate. Crystallize the resulting oil from benzene/pentane to obtain 5 parts of pure title compound, M.P. 87° to 88°.

Replacing the title compound of Example 9 with an equivalent of either 8 - methoxy - 1,2,10b - trimethyl-1,2,3,5,6,10b - hexahydropyrrolo[2,1-a]isoquinoline methiodide or 2,10b - diethyl - 1,2,3,5,6,10b - hexahydropyrrolo[2,1-a]isoquinoline methiodide results in the preparation, in similar manner, of the corresponding compound I.

EXAMPLE 13

3-methyl-7-benzyl-9,10-dimethoxy-1H-2,3,4,5,6,7-hexahydro-3-benzazonine

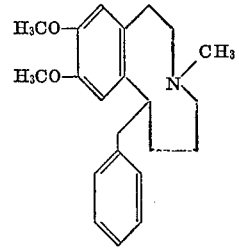

Suspend 9 parts of the title compound of Example 10 in 400 parts by volume of liquid ammonia (in a flask immersed in a Dry Ice/acetone bath). Add (with stirring) 2.5 parts of sodium to the resulting suspension. After continuing the stirring for an hour following the sodium addition, permit the obtained reaction mixture to evaporate for 17 hours.

Admix the resulting residue successively with methanol, with water and with diethylether. Wash the ether phase with water; dry same over sodium sulfate; and evaporate. Crystallize the resulting oil from methanol and recrystallize the resulting precipitate from methanol to obtain 3.5 parts of title compound, M.P. 94° to 96°.

Replacing the title compound of Example 10 with an equivalent of either 10b-p-methoxyphenyl - 2 - methyl-8,9 - methylenedioxy - 1,2,3,5,6,10b - hexahydropyrrolo[2,1-a]isoquinoline methiodide or 1,2 - diethyl - 10b-(3,5 - dimethoxybenzyl)-1,2,3,5,6,10b-hexahydropyrrolo[2,1-a]isoquinoline methiodide results in the preparation, in similar manner, of the corresponding compound I.

What is claimed is:
1. A compound of the formula

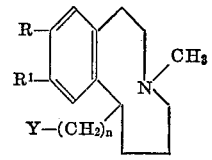

where:
R is a member selected from the group consisting of a hydrogen atom, methyl, ethyl, lower straight chain alkoxy and, together with $R^1$, methylenedioxy;
$R^1$ is a member selected from the group consisting of a hydrogen atom, methyl, ethyl, lower straight chain alkoxy and, together with R, methylenedioxy;
Y is a phenyl of the formula

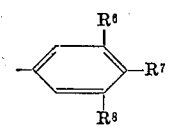

$n$ is one of the integers 1, 2 and 3; and
each of $R^6$, $R^7$ and $R^8$ is a member selected from the group consisting of a hydrogen atom, methyl, ethyl, lower straight chain alkoxy and, together with the member on an adjacent carbon atom, methylenedioxy.

2. The compound according to claim 1 which is 3-methyl-7-benzyl-9,10-dimethoxy - 1H-2,3,4,5,6,7-hexahydro-3-benzazonine.

3. A process for preparing a compound of the formula

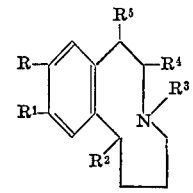

which comprises reacting a compound of the formula

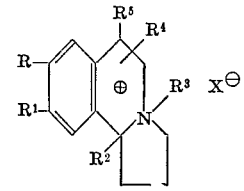

wherein
R is a member selected from the group consisting of a hydrogen atom, methyl, ethyl, lower straight chain alkoxy and, together with $R^1$, methylenedioxy;
$R^1$ is a member selected from the group consisting of a hydrogen atom, methyl, ethyl, lower straight chain alkoxy and, together with R, methylenedioxy;
$R^2$ is a member selected from the group consisting of a hydrogen atom, lower straight chain alkyl, —Y and —$(CH_2)_n$—Y;
Y is a phenyl of the formula

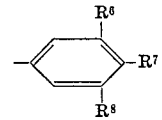

$n$ is one of the integers 1, 2 and 3;
$R^3$ is a lower straight chain alkyl;

each of $R^4$ and $R^5$ is, independently, a member selected from the group consisting of a hydrogen atom, methyl and ethyl;

each of $R^6$, $R^7$ and $R^8$ is a member selected from the group consisting of a hydrogen atom, methyl, ethyl, lower straight chain alkoxy and, together with the member on an adjacent carbon atom, methylenedioxy; and X is a halogen atom;

with an alkali metal, in liquid ammonia or an amine solvent, at a temperature of from $-70°$ C. to $0°$ C.

4. A process according to claim 1 wherein the alkali metal is sodium.

5. A process according to claim 1 wherein the solvent is liquid ammonia.

6. A process according to claim 1 wherein X is iodine.

References Cited

UNITED STATES PATENTS

| | | | |
|---|---|---|---|
| 3,055,883 | 9/1962 | Mull | 260—239 |
| 3,314,963 | 4/1967 | Koch | 260—239 |
| 3,393,192 | 7/1968 | Walter et al. | 260—239 |

FOREIGN PATENTS

| | | | |
|---|---|---|---|
| 2,710M | 8/1964 | France | 260—239 |

ALTON D. ROLLINS, Primary Examiner

U.S. Cl. X.R.

260—283, 286, 289, 340.5, 558, 559, 561; 424—244, 282